May 19, 1925.
J. J. KING
1,538,045
FEED WATER HEATING AND DELIVERING APPARATUS
Filed Sept. 14, 1923
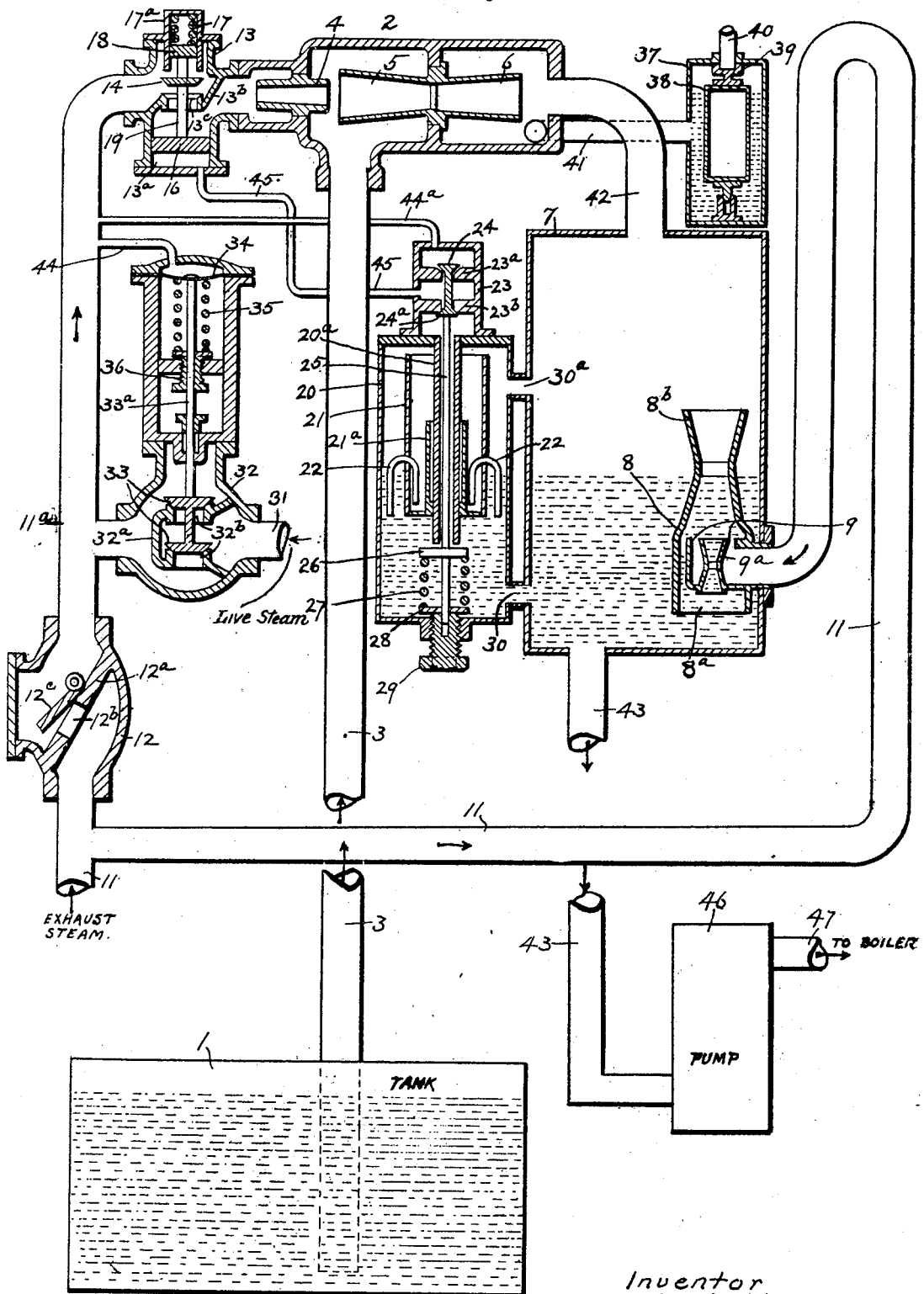

Patented May 19, 1925.

UNITED STATES PATENT OFFICE.

JOHN J. KING, OF BOSTON, MASSACHUSETTS.

FEED-WATER HEATING AND DELIVERING APPARATUS.

Application filed September 14, 1923. Serial No. 662,753.

*To all whom it may concern:*

Be it known that I, JOHN J. KING, a citizen of the United States, residing at Boston, in the county of Suffolk and State of Massachusetts, have invented new and useful Improvements in Feed-Water Heating and Delivering Apparatus, of which the following is a specification.

The invention is embodied in a feed-water heating and delivering apparatus adapted to lift feed water from a supply tank and heat the same when lifted, by the action of exhaust steam which both lifts and heats the water, and to deliver the heated water to a boiler by a pump of any suitable type, whose only duty is to force the lifted and heated water to the boiler.

The apparatus of my invention is distinguished from those heretofore employed by the fact that only one pump is employed instead of two pumps, as heretofore, one for lifting water to a heater, and the other for delivering the heated water to a boiler.

The accompanying drawing shows a vertical section of an apparatus embodying the invention, certain parts being shown in elevation.

1 designates an open tank containing feed water. This may be the tank of a locomotive tender, or a stationary tank.

2 designates an ejector for lifting water from the tank, said ejector including a casing to which the numeral 2 is applied, and the usual nozzles 4, 5 and 6, constituting a Venturi tube, the nozzle 5 being the suction element, and the nozzle 6 the delivering element of the ejector.

3 designates a suction pipe connecting the feed tank 1, with the suction of the ejector.

7 designates a tank in which feed water is heated, this being called the heater tank. Said tank contains a water-circulating heater operating as an injector, causing exhaust steam from a conduit which includes a supply pipe 11, to circulate water in the heater tank by raising it from the lower portion of the tank and discharging it into the upper portion of the tank, the water being heated by the exhaust steam while it is being circulated. The heater includes a vertically arranged conduit 8, open at both ends, its lower end constituting a suction nozzle $8^a$ and its upper end a discharge nozzle $8^b$, forming with the intermediate portion of the conduit 8 a Venturi tube.

The steam supply pipe 11 enters the conduit between the said nozzles and has an annular outlet nozzle 9, surrounding the discharge nozzle of a vertically arranged inner Venturi tube $9^a$, the suction nozzle of which communicates with the suction nozzle $8^a$.

Steam from the supply pipe 11 passes upward through the annular nozzle 9, induces an upward flow of water through the heater, and heats the flowing water, the heated effluent from the nozzle $8^b$ returning to the lower portion of the heater tank, to be again raised and heated.

The steam conduit includes, in addition to the supply pipe 11, a branch $11^a$, provided with a check valve including a casing 12, a partition $12^a$, containing a port $12^b$, and a hinged clapper valve member $12^c$, adapted to open and close said port.

13 designates a valve casing which communicates with the branch $11^a$, and includes a cylinder $13^a$ and a partition $13^b$, having a port $13^c$, forming a valve seat. A valve 14 in said casing is connected by a stem 19 with a piston 16 in said cylinder. Downward pressure is exerted on the valve by a spring 17, acting on a head 18, which is fixed to the valve stem and is contained in a housing $17^a$.

20 designates an auxiliary tank, forming an element of means for controlling the water level in the heater tank 7. Vertically movable in the auxiliary tank 20 is a bucket float 21, closed at its lower end and movable on a vertical pipe $20^a$, fixed to the upper end of the auxiliary tank, and terminating above the bottom thereof. The pipe $20^a$ guides the float and has an additional function which is to permit the exhaust steam from cylinder $13^a$ to enter water in tank 20, creating a partial vacuum in cylinder $13^a$.

The float 21 is provided with a stand-pipe $21^a$, fixed to the bottom of the float and terminating below the upper end thereof. Siphon pipes 22 are fixed to the float 21, and have shorter legs within the float and longer legs between the float and the wall of the auxiliary tank 20. Said siphon pipes act to alternately admit water to the float and withdraw water therefrom, as described hereinafter.

Fixed to the top of the auxiliary tank 20 is a controlling valve casing 23, constituting an element of means for controlling the passage of steam from the supply pipe branch 11ᵃ to the cylinder 13ᵃ. Said casing has partitions 23ᵃ and 23ᵇ, containing valve seats for a downwardly facing upper valve 24, and an upwardly facing lower valve 24ᵃ. Said valves are connected to move in unison, and are fixed to a stem 25, extending through the pipe 20ᵃ, and yieldingly supported and subjected to upward pressure by a spring 27, interposed between a collar 26 on the stem, and a washer 28, supported by an adjusting screw 29, whereby the tension of the spring 27 may be regulated.

30 and 30ᵃ designate lower and upper conduits connecting the heater tank 7 with the auxiliary tank 20, and permitting water and vapor to flow to the auxiliary tank from the heater tank, so that the same water level is maintained in both tanks.

31 designates a portion of a high pressure steam pipe, connected with any suitable source of supply, such as the steam space of a boiler. The discharge end of the pipe 31 communicates with a pressure-reducing valve casing 32, which in turn communicates with the branch 11ᵃ of the exhaust supply pipe. Said casing is provided with a partition 32ᵃ, containing ports 32ᵇ, constituting upwardly facing valve seats. An extension of the casing 32 contains a diaphragm 34, a spring 35, bearing at one end on the diaphragm, and an adjusting screw 36 on which the outer end of the spring bears. The ports 32ᵇ are controlled by two valves 33, fixed to a stem 33ᵃ, which extends through the adjusting screw 36, and through a stuffing-box below said screw, the upper end of the stem being secured to the diaphragm 34. The upper end of the reducing valve casing is connected above the diaphragm with the exhaust pipe branch 11ᵃ, by a pipe 44. The upper end of the casing 23 is connected above the valve 24 with the branch 11ᵃ by a pipe 44ᵃ. The casing 23 is connected, between the valves 24 and 24ᵃ, with the cylinder 13ᵃ by a pipe 45.

37 designates a float tank, containing a vertically movable float 38 and a valve 39 fixed to the upper end of the float. The float tank has an outlet pipe 40 at its upper end, and is connected between its ends by an inlet pipe 41, with the casing of the ejector 2.

42 designates a water supply pipe, connecting the ejector casing with the upper end of the heater tank 7.

43 designates an outlet pipe connecting the lower end of the heater tank with the intake of a pump 46, the discharge of which is suitably connected by a pipe 47 with the water space of the boiler.

At the commencement of the operation a portion of the exhaust steam passes through the branch 11ᵃ, the check valve therein being opened by the steam pressure. This steam passes through the casing 13, the valve 14 having been opened by the passage of steam through pipe 44ᵃ, valve 24, and pipe 45. Such steam operates on piston 16 in cylinder 13ᵃ. The steam passing through pipe 44ᵃ passes through the ejector nozzles 4, 5 and 6, after the opening of valve 14. The vacuum thus created in the ejector and in the suction pipe 3, lifts water from the tank 1, which passes from the ejector to the heater tank 7, through the pipe 42. At the same time another portion of the exhaust steam passes through pipe 11 to the heater 8 in the heater tank 7. This steam in passing through the annular nozzle 9, creates a vacuum in the heater 8, so that water is circulated and heated as previously described, in the heater tank. As the water rises in the heater tank, the same level is maintained in the auxiliary tank 20. The water rising in this tank eventually raises the bucket 21 to the top of the tank, its upward movement being thus arrested. The bucket then commences to fill through the siphon tubes 22. When sufficient water has entered the bucket to deprive it of buoyancy, the bucket sinks, strikes the collar 26, depresses the valve stem 25 against the pressure of the spring 27, closes the valve 24 and opens the valve 24ᵃ.

This action closes the steam supply through pipe 44ᵃ and permits the cylinder 13ᵃ to exhaust to the tank 20 through pipe 45 and valve 24ᵃ. An unbalanced pressure on the piston 16 results, and this, in conjunction with the pressure exerted by spring 17, causes the valve 14 to close and shut off the steam supply to the ejector 2. Any water remaining in the ejector and the suction pipe 3, now returns to the tank 1.

When the steam supply to the ejector is closed, the water in float tank 37 flows through pipe 41 to the ejector and through suction pipe 3 to tank 1, until the water in the float tank stands at a low level, determined by the lower side of the pipe 41. This allows the float 38 to sink with the valve 39, and opens the float tank 37 to the atmosphere, through outlet 40. The object of thus providing an outlet to the atmosphere is as follows:

If steam when first admitted to the ejector 2, through valve 14, were allowed to flow into the heater tank, without the described outlet, a balance would be created between the inlet and the outlet nozzles of the ejector, hence a vacuum would not be created in the suction pipe 3, and water would not be lifted from the tank 1. When the float tank valve 39 is opened, free passage of steam to the atmosphere is permitted and an unbalanced pressure is maintained between said inlet and outlet nozzles.

When the water begins to flow through the suction pipe 3, a portion of it enters the float tank 37, causing the float 38 to rise and close the valve 39 to prevent escape of water through the outlet 40, all of the water then passing to the heater tank 7.

When the exhaust steam in branch 11ª drops below the predetermined pressure necessary to operate the ejector, as when an engine supplying the exhaust steam is stopped, or, if a locomotive engine is coasting, the pressure is lowered on the diaphragm 34 of the reducing valve. The spring 35 then raises the diaphragm and the valve members 33 of the reducing valve thus allowing live steam from the pipe 31 to enter the branch 11ª, and close the check valve at 12. The live steam now supplies the ejector 2, until the exhaust steam pressure is sufficiently increased to open the check valve, depress the diaphragm 34 and close the valve members 33 of the reducing valve.

When the bucket 21 in the auxiliary tank 20 has shut off the supply of steam to the cylinder 13ª, by operating the valves 24 and 24ª as previously described, the bucket is submerged and rests on the collar 26 of the valve stem 25. As the water in the heater tank 7 and the auxiliary tank 20 falls, in consequence of withdrawal of water by the pump 46, the water in the bucket 21 flows out through the siphon tubes 22, until the water in the bucket is at the same level as that in the tank 20. When the level of the water in the bucket 21 reaches the bottom of the bends in the siphon tubes, it is siphoned by said tubes from the bucket, as the water level on the outside of the bucket continues to fall, until sufficient water has been withdrawn from the bucket to allow the spring 27 to open the valve 24, close the exhaust valve 24ª. Steam then flows through the pipes 44ª and 45 to the cylinder 13ª and acts on the piston 16 to open the valve 14, so that the steam is admitted to the ejector.

The described arrangement for siphoning water from the bucket 21 decreases the resistance to the upward movement of the valves 24 and 24ª by the spring, and enables the spring to act as described, even though its initial force may have been reduced by crystallization or otherwise.

The apparatus may be organized to operate as an open system by omitting the float 38, valve 39, and tank 37, and extending the pipe 41 vertically as a stand-pipe which permits the free access of steam to atmosphere to maintain an unbalanced condition in the system before a vacuum is created in suction pipe 3 sufficient to lift water from tank 1.

I claim:

1. An apparatus of the character stated comprising, in combination, a heater tank having an inlet and an outlet, a suction pipe; an ejector communicating with the suction pipe and with the tank inlet, and including means operable by exhaust steam to cause a flow of feed water through the suction pipe and into the heater tank, a heater within the tank, including means operable by exhaust steam to circulate, in the tank, water heated by the exhaust steam, an exhaust steam conduit communicating with the ejector and the heater, and a force pump communicating with the heater tank outlet, the arrangement being such that exhaust steam supplied to the ejector causes the ejector to draw feed water through the suction pipe and deliver it to the heater tank, while exhaust steam supplied to the heater causes the latter to circulate and heat the water delivered by the ejector, so that the force pump draws heated water from the heater tank.

2. An apparatus of the character stated, comprising a heater tank, having an inlet and an outlet, an ejector communicating with the tank inlet and operable by exhaust steam to deliver feed water to the said inlet, a suction pipe communicating with the ejector, a heater within the tank operable by exhaust steam to circulate and heat the water in the tank, an exhaust steam conduit communicating with the ejector and with the heater, a force pump communicating with the heater tank outlet, and automatic means for controlling the admission of steam to the ejector.

3. An apparatus of the character stated, comprising a heater tank, having an inlet and an outlet, an ejector communicating with the tank inlet and operable by exhaust steam to deliver feed water to the said inlet, a suction pipe communicating with the ejector, a heater within the tank operable by exhaust steam to circulate and heat the water in the tank, an exhaust steam conduit communicating with the ejector and with the heater, a force pump communicating with the heater tank outlet, an ejector valve adapted to open and close the communication between the steam conduit and the ejector, and means operable by variations in the water level in the heater tank, and by steam pressure in the steam conduit, for opening and closing the ejector valve.

4. An apparatus of the character stated, comprising a heater tank, having an inlet and an outlet, an ejector communicating with the tank inlet and operable by exhaust steam to deliver feed water to the said inlet, a suction pipe communicating with the ejector, a heater within the tank operable by exhaust steam to circulate and heat water in the tank, an exhaust steam conduit communicating with the ejector and with the heater, a force pump communicating with the heater tank outlet, an ejector valve adapted to open and close communication between the steam conduit and the ejector, said valve including a cylinder, a valve-opening piston therein, and a member to assist the closing of the valve, means operable by a lowering of the water level in the heater tank to admit steam to the cylinder and open the ejector valve, and by a raising of said water level to shut off steam from the cylinder and permit the closing of the ejector valve by the said closing member.

5. An apparatus of the character stated, comprising a heater tank, having an inlet and an outlet, an ejector communicating with the tank inlet and operable by exhaust steam to deliver feed water to the said inlet, a suction pipe communicating with the ejector, a heater within the tank operable by exhaust steam to circulate and heat the water in the tank, an exhaust steam conduit communicating with the ejector and with the heater, a force pump communicating with the heater tank outlet, an ejector valve adapted to open and close communication between the steam conduit and the ejector, said valve including a cylinder, a valve-opening piston therein, and a member to assist the closing of the valve, an auxiliary tank communicating with the heater tank, a bucket vertically movable by water in the auxiliary tank, and provided with siphon tubes, adapted to receive water from the auxiliary tank when the bucket is in its highest position, a valve casing above the auxiliary tank, having upper and lower valve seats, spaced from each other and from the upper end of the casing, and forming an upper and a lower chamber in said casing, a steam connection between the upper chamber and the steam conduit, a steam connection between the lower chamber and the ejector valve cylinder, valves adapted to close either valve seat and open the other, and a spring-raised valve stem supporting said valves, and adapted to be depressed by the bucket, the said siphon tubes being adapted to discharge water from the bucket when the latter is lowered.

6. An apparatus of the character stated, comprising a heater tank, having an inlet and an outlet, an ejector communicating with the tank inlet and operable by exhaust steam to deliver feed water to the said inlet, a suction pipe communicating with the ejector, a heater within the tank operable by exhaust steam to circulate and heat the water in the tank, an exhaust steam conduit communicating with the ejector and with the heater, a force pump communicating with the heater tank outlet, and automatic means for causing an unbalanced condition in the apparatus when its operation is commencing.

7. An apparatus of the character stated, comprising a heater tank, having an inlet and an outlet, an ejector communicating with the tank inlet and operable by exhaust steam to deliver feed water to the said inlet, a suction pipe communicating with the ejector, a heater within the tank operable by exhaust steam to circulate and heat the water in the tank, an exhaust steam conduit communicating with the ejector and with the heater, a force pump communicating with the heater tank outlet, a float tank communicating with the ejector, and provided with an outlet to the atmosphere, and a float in said tank having a valve adapted to open and close said outlet.

8. An apparatus of the character stated, comprising a heater tank, having an inlet and an outlet, an ejector communicating with the tank inlet and operable by exhaust steam to deliver feed water to the said inlet, a suction pipe communicating with the ejector, a heater within the tank operable by exhaust steam to circulate and heat the water in the tank, an exhaust steam conduit communicating with the ejector and with the heater, a force pump communicating with the heater tank outlet, the said steam conduit including a branch communicating with the said ejector, and provided with a check valve, the apparatus comprising also means for admitting live steam to the ejector when the pressure of the exhaust steam is reduced, said means including a pressure-reducing valve casing communicating with said branch above the check valve, and with a live steam conduit, a valve in said casing, adapted to open and close the communication between the said live steam conduit and branch, said casing having an extension communicating at its upper end with said branch, a diaphragm in said extension, adapted to be depressed by steam pressure, a spring exerting upward pressure on the diaphragm, and a stem connecting the diaphragm with said valve.

9. An apparatus of the character stated, comprising a heater tank, having an inlet and an outlet, an ejector communicating with the tank inlet and operable by exhaust steam to deliver feed water to the said inlet, a suction pipe communicating with the ejector, a heater within the tank operable by exhaust steam to circulate and heat the water in the tank, an exhaust steam conduit communicating with the ejector and with the heater, a force pump communicating with the heater tank outlet, and automatic means for intermittently releasing steam from the apparatus to the atmosphere.

10. An apparatus of the character stated, comprising a heater tank, having an inlet and an outlet, an ejector communicating with the tank inlet and operable by exhaust steam to deliver feed water to the said inlet, a suction pipe communicating with the ejector, a heater within the tank operable by exhaust steam to circulate and heat the water in the tank, an exhaust steam conduit communicating with the ejector and with the heater, a force pump communicating with the heater tank outlet, the said steam conduit including a branch conduit communicating with said ejector and provided with a check valve, the apparatus comprising also a live steam conduit, a pressure reducing valve interposed between the live steam conduit and the said branch conduit, and adapted to be automatically closed when the pressure of exhaust steam is above a predetermined degree, and opened when the exhaust steam pressure is reduced, thus permitting live steam to enter the system.

In testimony whereof I have affixed my signature.

JOHN J. KING.